United States Patent
Ito et al.

(10) Patent No.: US 7,778,990 B2
(45) Date of Patent: Aug. 17, 2010

(54) DATA PRESENTATION DEVICE, COMPUTER READABLE MEDIUM AND DATA PRESENTATION METHOD

(75) Inventors: Naohiro Ito, Kawasaki (JP); Nobuyuki Takebe, Yokohama (JP); Jo Ajisawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 346 days.

(21) Appl. No.: 11/901,469

(22) Filed: Sep. 17, 2007

(65) Prior Publication Data

US 2008/0077589 A1 Mar. 27, 2008

Related U.S. Application Data

(63) Continuation of application No. PCT/JP2005/004931, filed on Mar. 18, 2005.

(51) Int. Cl.
G06F 17/30 (2006.01)
(52) U.S. Cl. .................. 707/705; 707/736; 707/752; 707/753
(58) Field of Classification Search .................. 707/705, 707/736, 752, 753; 715/736, 764
See application file for complete search history.

(56) References Cited

U.S. PATENT DOCUMENTS 5,483,631 A * 1/1996 Nagai et al. .................. 715/736
5,640,554 A 6/1997 Take 6,380,984 B1 * 4/2002 Inoue et al. .................. 348/569
2005/0154708 A1 * 7/2005 Sun .............................. 707/3

FOREIGN PATENT DOCUMENTS

| JP | 06-149897 | 5/1994 |
|----|-----------|--------|
| JP | 07-160475 | 6/1995 |
| JP | 07-296179 | 11/1995 |
| JP | 2001-014139 | 1/2001 |
| JP | 2001-296849 | 10/2001 |
| JP | 2001-331487 | 11/2001 |
| JP | 2002-157059 | 5/2002 |
| JP | 2003-044267 | 2/2003 |

* cited by examiner

Primary Examiner—Jean M Corrielus
(74) Attorney, Agent, or Firm—Greer, Burns & Crain, Ltd.

(57) ABSTRACT

A data presentation device with a memory storage area being used without any futility is disclosed. The data presentation device has a function of preparing on a memory and displaying on a display the first through Nth records of presentation target data group in designated sort data that is obtained when sorting all the presentation target data within a database under designated sort conditions in a form that does not store in the memory the presentation target data assured of being the (N+1)th through the last records of data, and a function of preparing on the memory and displaying on the display the ((K+1)·(N+1))th through the ((K+2)·N)th records of presentation sort data group in the designated sort data in a form that limits the processing target presentation sort data within the database by use of a value of a sort key within the ((K+1)·N)th record of presentation sort data displayed on the display when instructed to display the next presentation sort data group and in a form that does not store in the memory the presentation sort data assured of being unrequired.

10 Claims, 11 Drawing Sheets

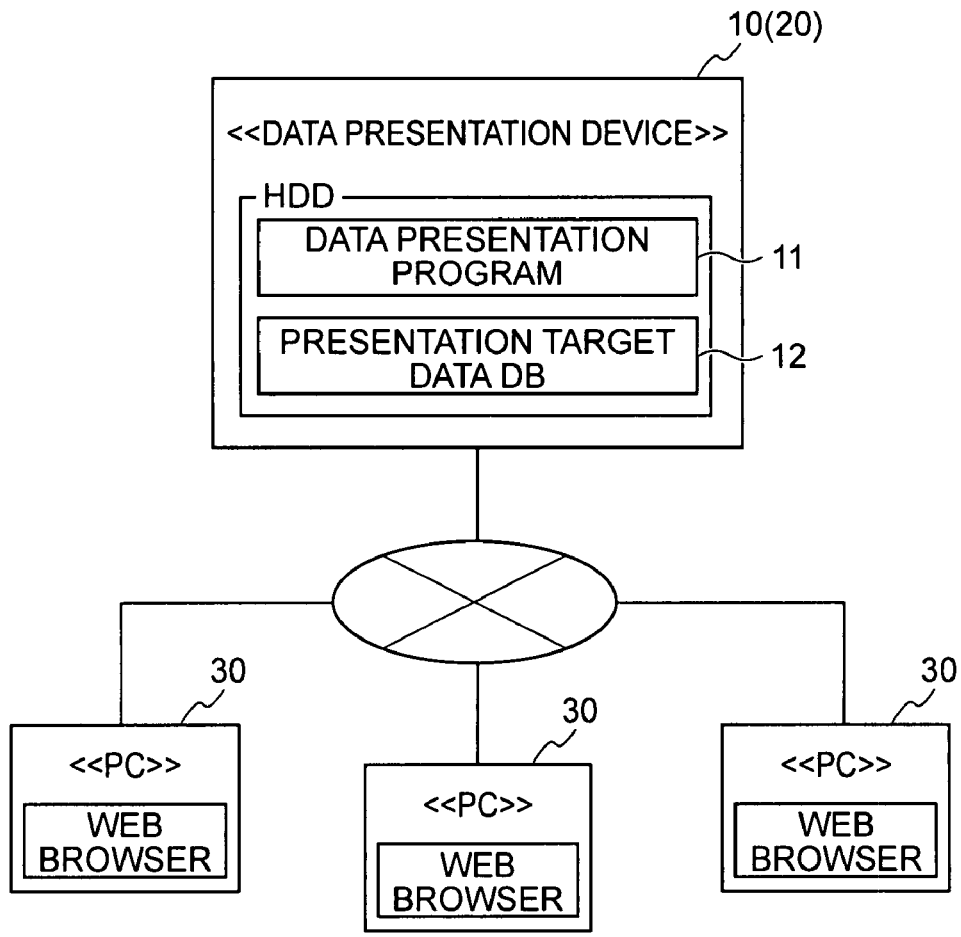

FIG.8

| PAGE NUMBER | DELIMITER DATA IDENTIFYING INFORMATION |
|---|---|
| 1 | SORT KEY VALUE AND ROW ID OF 1ST RECORD OF PRESENTATION TARGET DATA |
| 2 | SORT KEY VALUE AND ROW ID OF 101ST RECORD OF PRESENTATION TARGET DATA |
| 3 | SORT KEY VALUE AND ROW ID OF 201ST RECORD OF PRESENTATION TARGET DATA |
| 9 | SORT KEY VALUE AND ROW ID OF 801ST RECORD OF PRESENTATION TARGET DATA |
| 10 | SORT KEY VALUE AND ROW ID OF 901ST RECORD OF PRESENTATION TARGET DATA |
| 11 | SORT KEY VALUE AND ROW ID OF 1000TH RECORD OF PRESENTATION TARGET DATA |

| PAGE NUMBER | DELIMITER DATA IDENTIFYING INFORMATION |
|---|---|
| 51 | SORT KEY VALUE AND ROW ID OF 5001ST RECORD OF PRESENTATION TARGET DATA |
| 52 | SORT KEY VALUE AND ROW ID OF 5101ST RECORD OF PRESENTATION TARGET DATA |
| 0 | SORT KEY VALUE AND ROW ID OF 5150ST RECORD OF PRESENTATION TARGET DATA | though
DATA PRESENTATION DEVICE, COMPUTER READABLE MEDIUM AND DATA PRESENTATION METHOD This application is a Continuation of PCT/JP05/04931, filed on Mar. 18, 2005.

TECHNICAL FIELD

The present invention relates to a data presentation device that presents a group of plural records of presentation sort data to a user in a form that sorts these records of presentation sort data, a data presentation program for making a computer function as this type of data presentation device, and a data presentation method for presenting the group of plural records of presentation sort data to the user in a form that sorts these records of data.

BACKGROUND ARTS

As known well, the device for providing the user with the data within a database is configured to have a function of sorting all of data groups within a database and a data group that meets designated search conditions within the database (refer to, e.g., Patent document 1). Further, such a type of device is configured to display every 20 through 100 records of data of the sorted data group.

The conventional device described above is, however, a device that prepares on a memory the sort data into which all of sort target data is sorted only when instructed to display the data in a way that sorts the data (which is a device presenting to the user every about 20 through 10 records of data in the sort data prepared on the memory), or a device that prepares on the memory the sort data into which all of the sort target data is sorted when instructed to display the data in a way that sorts the data and when instructed to display a next sort result (which is a device that discards the sort data after presenting the data to the user).

Considering that approximately 20 through 100 records of data are at first presented to the user and that the user might not make a request for displaying the data thereafter, the operation of the conventional device can be said to have a high possibility that a storage area of the memory is used with futility.

[Patent document 1] Patent Application Publication No. 2003-44267

BRIEF SUMMARY OF THE INVENTION

The present invention aims at providing a data presentation device and a data presentation method each capable of presenting to a user a sorted result of the data in a form that uses a storage area of a memory without any futility, and a data presentation program capable of making a computer function as such a type of data presentation device.

For solving the problems, according to the present invention, a data presentation device comprises: a sort target database stored with plural records of presentation target data; input accepting means accepting an input of sort condition designating information for designating which data item partially structuring the presentation target data is set as a sort key; main sort data first display means preparing, on a display, main sort data corresponding to first through Nth records of presentation target data group in designated sort data defined as data obtained by sorting all the presentation target data stored in the sort target database when the input accepting means accepts the input of the sort condition designating information under conditions designated by the sort condition designating information in a form that does not store in the memory the presentation target data assured of being the (N+1)th through last records of data, and displaying the thus-prepared main sort data on a display; display instruction accepting means accepting a next main sort data display instruction that instructs the display to display the main sort data corresponding to the ((K+1)·(N+1))th through the ((K+2)·N))th records of presentation target data when the main sort data corresponding to the (K·(N+1))th through the ((K+1)·N)th records of presentation target data (where K is a natural number) in the designated sort data is displayed on the display; and main sort data second display means limiting processing target presentation target data within the sort target database by use of a value of the sort key in the ((K+1)·N)th record of presentation target data that is, when the display instruction accepting means accepts the next main sort data display instruction, displayed at this point of time on the display, preparing on the memory the main sort data corresponding to the ((K+1)·(N+1))th through the ((K+2)·N)th records of presentation target data in the designated sort data in a form that does not store in the memory the presentation target data assured of being the ((K+2)·(N+1))th through last records of data, and displaying the thus-prepared main sort data on the display.

Namely, the data presentation device according to the present invention has a scheme of always executing none of a process of generating on the memory, when displaying the N-records of sorted presentation target data on the display, the data into which all the presentation target data stored in the sort target database is sorted under the conditions designated by the sort condition designating information. Accordingly, the data presentation device is, it can be said, a device capable of presenting to the user the sorted result of the data in a form that uses the storage area of the memory without any futility.

Then, a computer readable medium and a data presentation method according to the present invention are a medium and a method each capable of making a computer function as a device equivalent to the data presentation device according to the present invention. Accordingly, when employing the data presentation program and the data presentation method of the present invention, it follows that the device capable of presenting to the user the sorted result of the data in the form of using the storage area of the memory without any futility can be realized.

According to the present invention, it follows that the device capable of presenting to the user the sorted result of the data in the form of using the storage area of the memory without any futility can be realized. Moreover, the device presenting the sorted result of the data to the user can be, it also follows, manufactured in such a form that a storage capacity of a should-be-mounted memory is less than a should-be-processed data size.

BRIEF DESCRIPTION OF THE DRAWINGS

[FIG. 1] An explanatory diagram of a configuration and a usage mode of a data presentation device according to one embodiment of the present invention.

[FIG. 2] An explanatory diagram of a presentation target data DB provided in the data presentation device according to the embodiment.

[FIG. 8] An explanatory diagram of a presentation data management list generated when executing the processes in FIG. 7.

DETAILED DESCRIPTION OF THE INVENTION

Figure 3:
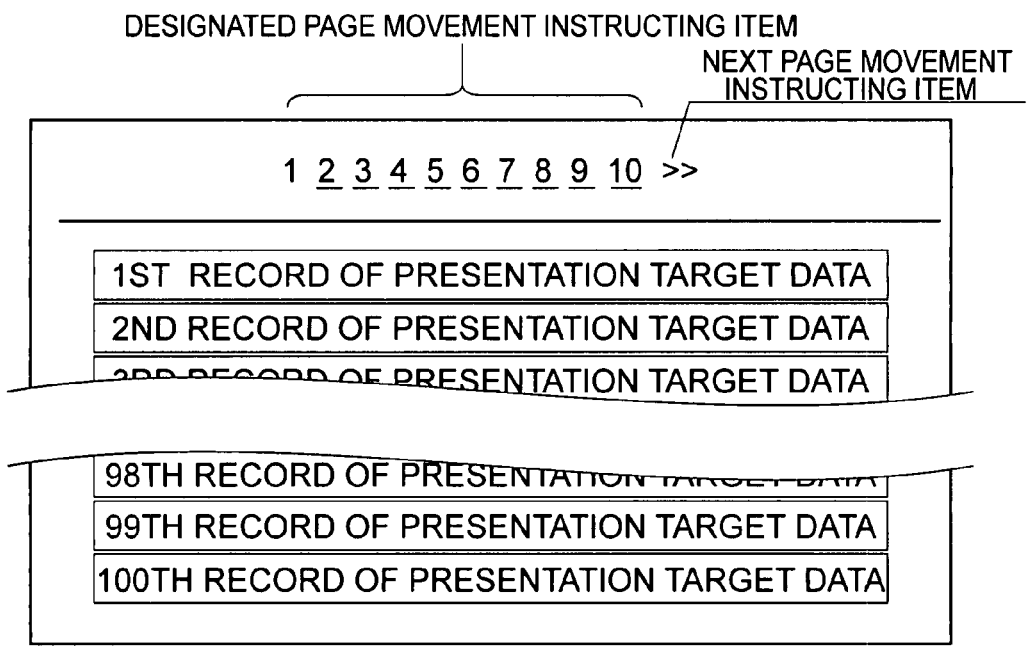
[FIG. 3] An explanatory diagram of a data presentation screen provided to a user by the data presentation device.

A best mode for carrying out the present invention will hereinafter be described in depth with reference to the drawings.

To start with, an outline of a data presentation device 10 according to one embodiment of the present invention will be described with reference to FIGS. 1-6.

As schematically illustrated in FIG. 1, the data presentation device 10 according to one embodiment of the present invention is such a type of device that a HDD of a computer 20 is stored with a data presentation program 11, a presentation target data DB 12, OS (unillustrated), etc. Further, the data presentation device 10 is the device used in a way that connects via a network to several PCs (personal computers) 30 each preinstalled with Web Browser.

The data presentation program 11 is a program that makes the data presentation device 10 (which is the computer 20 on which the program 11 itself runs) as a kind of Web application server.

The presentation target data DB 12 is a database stored with a large quantity (at least, several thousands of records) of data (which will hereinafter be termed presentation target data). The presentation target data DB 12 is, as schematically illustrated in FIG. 2, a database stored with the presentation target data consisting of values ("OO", "OX", etc) related to a variety of data items ("item 1", "item 2", etc) in a way that associates the presentation target data with "ROW ID" defined as information unique to each record of presentation target data.

Then, the data presentation device 10 (the data presentation program 11) according to the present embodiment is the device (the program) that provides a user with a result of sorting the presentation target data within the presentation target data DB 12 under sort conditions designated by the user of the PC 30 through, as shown in FIGS. 3-6, a Web page (which will hereinafter be referred to as a data presentation screen) displaying 100 records of data in the sorted result, and is also the device (the program) that does not execute a process of preparing, on a memory, the sorted data of all the presentation target data within the presentation target data DB 12 when providing each data presentation screen.

On the premise of what has been described so far, an operation (a function/content of the data presentation program 11) of the data presentation device 10 according to the present embodiment will hereinafter be specifically described.

The discussion starts with explaining a method of setting the sort conditions with respect to the data presentation device 10 and a function of the data presentation screen illustrated in FIGS. 3-6.

The data presentation device 10 according to the present embodiment has a function of providing a sort condition setting page to the user (an operator of the PC 30) who accesses via the Web Browser.

The sort condition setting page is a Web page that should be displayed by the user, when desiring to make use of the presentation target data stored in the presentation target data DB 12, on a display (in a window of the Web Browser) of the PC 30 of the user himself or herself (which will hereinafter simply be referred to as the self-PC 30).

The sort condition setting page is provided with an item (the item for designing a data item name that should be set as a first sort key) for setting the first sort key that should be used for sorting the presentation target data for the first time, an item for setting a second sort key that should be used for sorting data with the first sort key being overlapped, an item for setting a third sort key that should be used for sorting data with the first and second sort keys being overlapped, an item for setting a sorting direction designating value for designating a direction (a distinction between an ascending sequence and a descending sequence) of sorting based on the sort keys, and so on. Moreover, the sort condition setting page is provided with a transmission button, when pressed, functioning as an element that transmits an HTTP (HyperText Transfer Protocol) request (which is received by the data presentation device 10 and will hereinafter be referred to as a sort starting instruction request) containing information set in other respective items onto the network.

The user, who displayed the sort condition setting page on the display of the self-PC 30 in order to use the presentation target data within the presentation target data DB 12, sets at least the first sort key and the sorting direction designating value about the first sort key by manipulating the variety of items on the sort condition setting page, and thereafter presses the transmission button.

The data presentation screen (a first page on the data presentation screen) illustrated in FIG. 3 is a screen (Web page) displayed in the window of the Web Browser when the user performs this operation. The data presentation screen (FIG. 3) is a screen on which to display 100 records of presentation target data that are, it follows, lined up at the head thereof when sorting the presentation target data within the presentation target data DB 12 under the sort conditions designated by the user.

Figure 4:
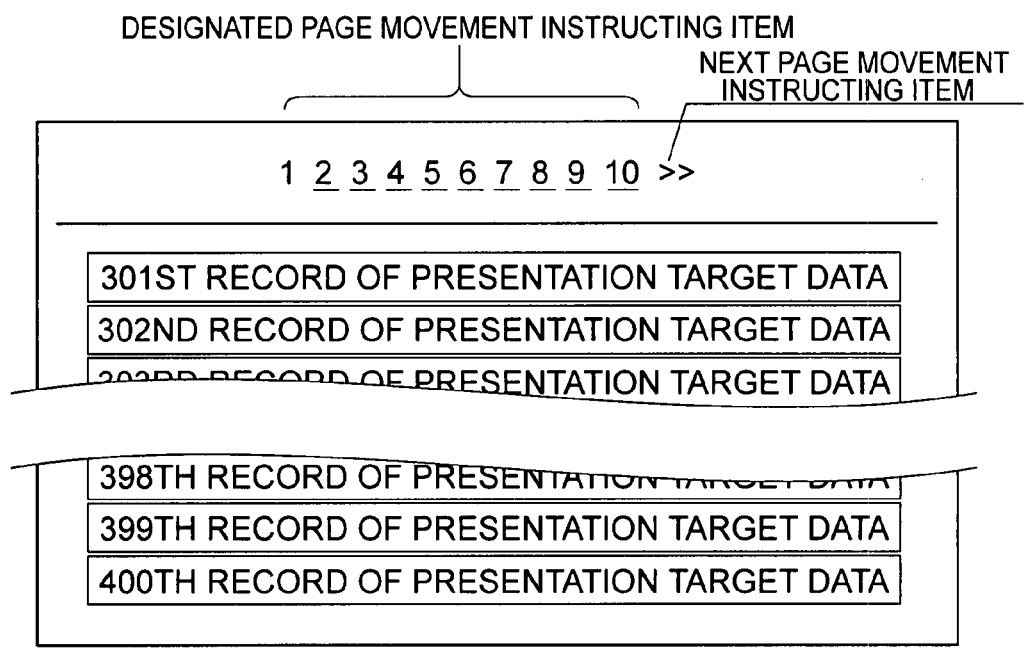
[FIG. 4] An explanatory diagram of the data presentation screen provided to the user by the data presentation device.
Figure 5:
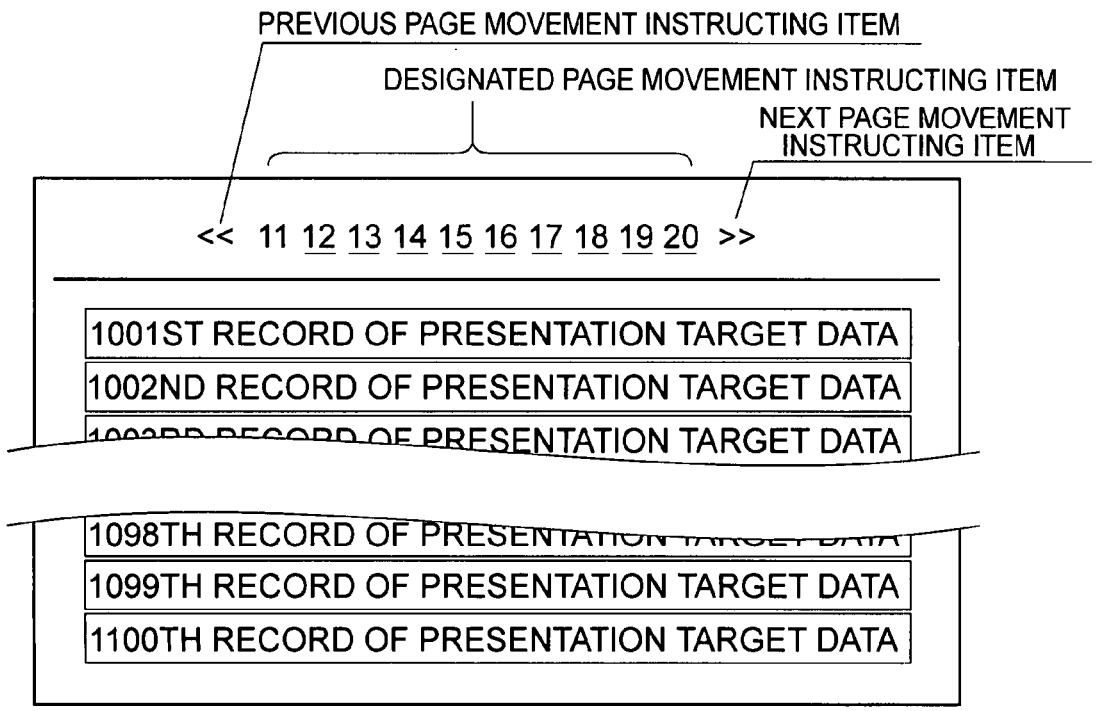
[FIG. 5] An explanatory diagram of the data presentation screen provided to the user by the data presentation device.

Further, the data presentation screen (FIG. 3) is a screen of which contents are changed to those shown in, e.g., FIG. 4 when manipulating (clicking) the item (a link with a page number being used as a link text) for instructing movement to an underlined designated page. Further, the data presentation screen (FIGS. 3 and 4) is a screen of which contents are changed to those in, e.g., FIG. 5 (the data presentation screen provided with a previous page movement designating item) when manipulating a next page movement designating item, and are changed to those shown in FIG. 6 when manipulating the previous page movement instructing item on the data presentation screen (FIG. 5).

Then, on every data presentation screen, each of the underlined designated page movement instructing items is an item, when manipulated (clicked), functioning as an element that transmits the designated page movement request (the HTTP request received by the data presentation device 10) containing the page number employed as the link text onto the network. Moreover, on every data presentation screen, the previous page movement instructing item is an item, when manipulated, functioning as an element that transmits a previous page movement request having a predetermined content (which is the HTTP request received by the data presentation device 10) onto the network, and the next page movement instructing item is an item, when manipulated, functioning as an element that transmits a next page movement request having a predetermined content (which is the HTTP request received by the data presentation device 10) onto the network.

Next, an operation of the data presentation device 10 with respect to each request will be explained.

Figure 7:
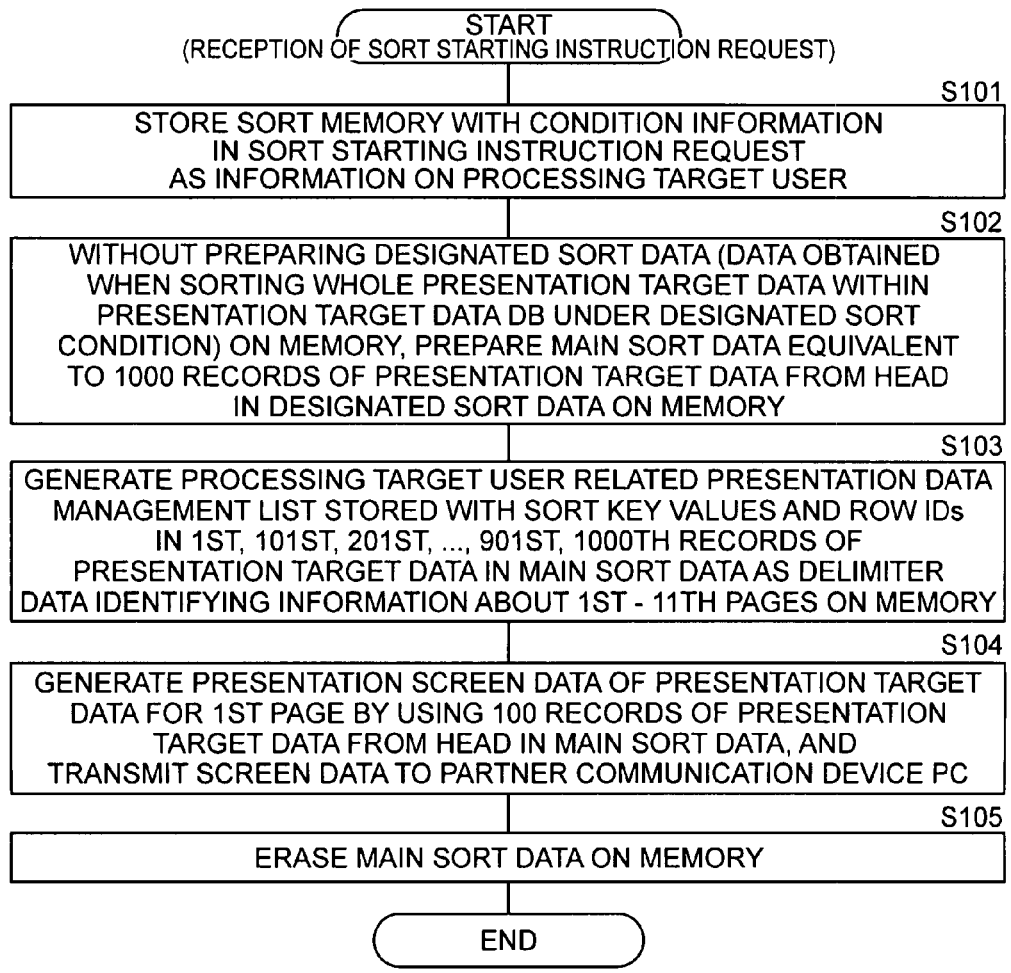
[FIG. 7] A flowchart of processes executed by the data presentation device when receiving a sort start instructing request.

When receiving the sort starting instruction request, the data presentation device 10 executes processes in procedures shown in FIG. 7.

To be specific, the data presentation device 10 receiving the sort starting instruction request, at first, stores the memory with an information group (which will hereinafter be expressed as sort condition designating information) contained in the sort starting instruction request as information about a processing target user (the operator of the PC 30 as a partner communication device) (step S101). Note that the data presentation device 10 starts a so-called session management process in step S101.

Subsequently, without preparing, on the memory, an aggregation of data (which is an aggregation of presentation target data and will hereinafter be termed designated sort data) into which the whole presentation target data within the presentation target data DB 12 is sorted based on designated sort conditions (the sort conditions designated by the sort key condition designating information contained in the sort starting instruction request), the data presentation device 10 executes a process (step S102) of preparing on the memory main sort data defined as records of data equivalent to 1000 records of presentation target data on the head side of the designated sort data. More specifically, the data presentation device 10 is, in order to prepare the main sort data on the memory, the device that in step S102, stores the memory with the presentation target data having a possibility of being the 1st through 1000th records of data with respect to the respective records of presentation target data within the presentation target data DB 12, then executes a process of storing the memory with none of the presentation target data assured of being the 1001st through the last data, and, while repeating these processes, executes a process of erasing from the memory the presentation target data assured of being the 1001st through the last data.

Note that in step S102 etc, the data presentation device 10 has a scheme of preparing, with respect to plural records of presentation target data with the respective sort key values being coincident, the main sort data in which the records of presentation target data are lined up in the ascending sequence of the ROW IDs.

The data presentation device 10 finishing the process in step S102 executes a process (step S103) of generating, on the memory, a presentation data management list having a structure as illustrated in FIG. 8 and related to the processing target user. To be specific, the data presentation device 10 executes the process of generating on the memory the presentation data management list as the processing target user related list stored (registered) with the sort key values (the values of the sort keys designated to be used for sorting) and the ROW IDs in the 1st, 101st, 201st, . . . , 901st and 1000th presentation target data within the main sort data on the memory as items of delimiter data identifying information about the first through eleventh pages.

Thereafter, the data presentation device 10 executes a process (step S104) of generating data presentation screen data for the first page by use of 100 records of presentation target data (a presentation target data group equivalent to 1st through 100th records of presentation target data in the designated sort data) on the head side in the main sort data, and transmitting the thus-generated data presentation screen data for the first page to the partner communication device PC 30 (the PC 30 defined as the sender of the sort starting instruction request). Note that the data presentation screen data for the first page, which is generated and transmitted by the data presentation device 10 in the process of step S104, is HTML (HyperText Markup Language) data enabling the partner communication device PC 30 receiving the data presentation screen data to display the data presentation screen (Web page) illustrated in FIG. 3.

Then, the data presentation device 10 terminating the process of step S104, after erasing the main sort data on the memory (step S105), finishes the processes in this diagram (the processes for the received sort starting instruction request).

Next, an operation of the data presentation device 10 with respect to the next page movement request will be explained.

Figure 9:
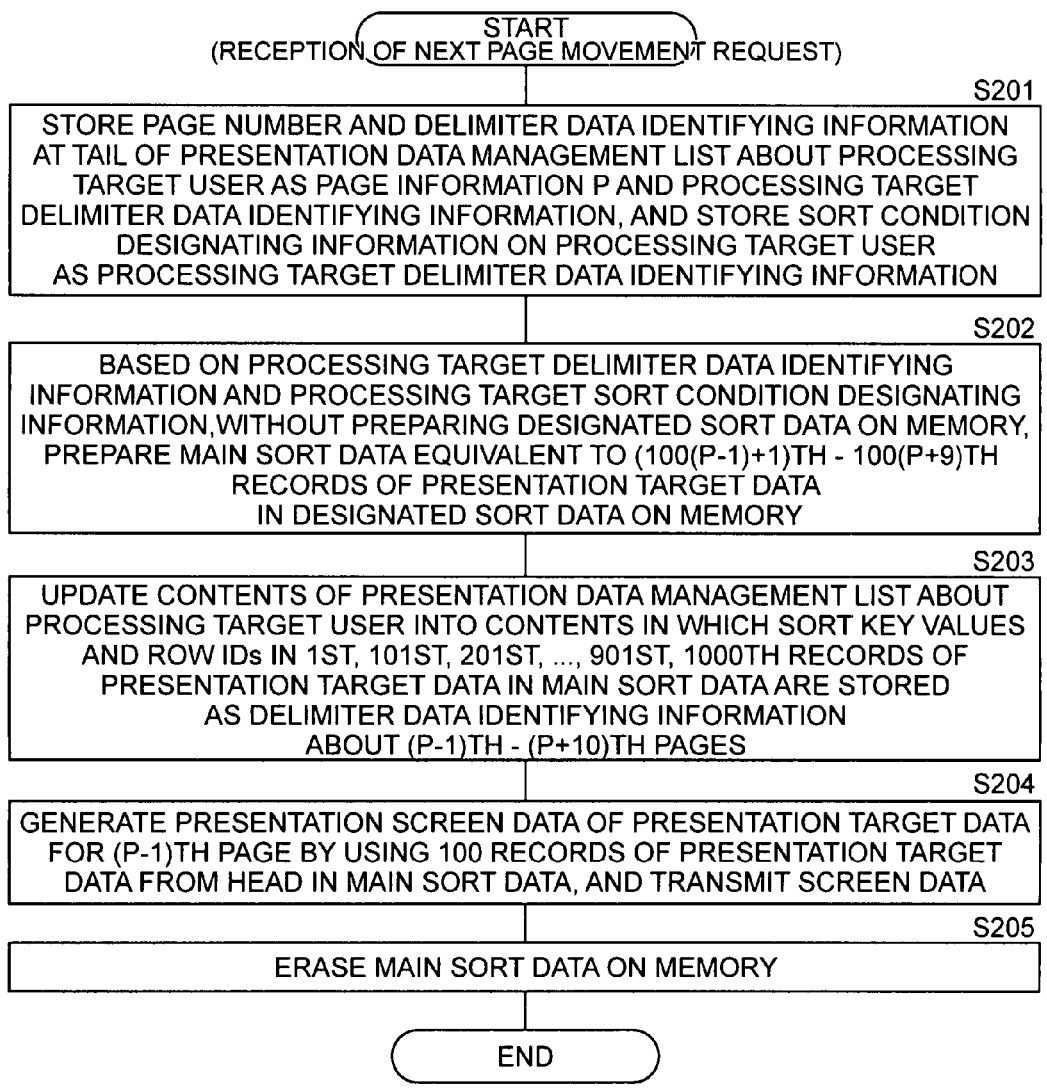
[FIG. 9] A flowchart of processes executed by the data presentation device when receiving a next page movement request.

When the next page movement request is transmitted, the data presentation device 10 executes processes in procedures shown in FIG. 9.

Namely, the data presentation device 10 receiving the next page movement request, to begin with, executes a process (step S201) of storing a page number and delimiter data identifying information that are stored at the tail of the presentation data management list (see FIG. 8) related to the processing target user (an operator of the next page movement request) as page information P and processing target delimiter data identifying information, and storing the sort condition designating information about the processing target user as processing target sort condition designating information.

Subsequently, the data presentation device 10 executes a process (step S202) of preparing, based on the processing target delimiter data identifying information and the processing target sort condition designating information, without preparing the designated sort data on the memory, the main sort data equivalent to (100·(P−1)+1)th through (100·(P+9))th records of presentation target data in the designated sort data on the memory.

The process executed by the data presentation device 10 in step S202 is basically the process having the same content as that of the process executed by the data presentation device 10 in step S102 (FIG. 7). The process executed by the data presentation device 10 in step S202 is, however, a process conducted in a way that targets at only the presentation target data of which the first sort key value, stored in the presentation target data DB 12, is equal to or larger than the first sort key value in the processing target delimiter data identifying information (which will hereinafter be referred to as a processing target first sort key value) if the sorting direction designated value about the first sort key in the processing target delimiter data identifying information is a value representing the ascending sequence (which will hereinafter be referred to as a processing target sorting direction designated value). Further, the process executed by the data presentation device 10 in step S202 is, if the processing target sorting direction designated value is a value representing a descending sequence, a process conducted in a way that targets at only the presentation target data of which the first sort key value, stored in the presentation target data DB 12, is equal to or smaller than the processing target first sort key value. Still further, the process executed by the data presentation device 10 in step S202 is a process in which the presentation target data of which the sort key value and the ROW ID are coincident with the sort key value and the ROW ID in the processing target delimiter data identifying information, is treated as the (100·(P−1)th record of presentation target data.

The data presentation device 10 finishing the process of step S202 executes a process (step S303) of updating the contents of the presentation data management list about the processing target user into the contents in which the respective sort key values and ROW IDs in the 1st, 101st, 201st, . . . , 901st and 1000th records of presentation target data (the presentation target data equivalent to the (100·(P−1)+1)th, (100·P+1)th, (100·(P+1)+1)th, . . . , (100·(P+8)+1)th and (100·(P+9)th records of data) in the main sort data on the memory, are stored as the delimiter data identifying information related to the (P−1)th through (P+10)th pages.

Thereafter, the data presentation device 10 executes a process (step S204) of generating the data presentation screen data for the (P−1)th page by employing 100 records of presentation target data (the presentation target data group equivalent to the (100·(P−1)+1)th through (100·P)th records of presentation target data in the designated sort data) on the head side in the main sort data on the memory, and transmitting the generated screen data to the partner communication device PC 30. Note that the data presentation screen data for the (P−1)th page, which is generated and transmitted by the data presentation device 10 in the process of step S204, is the HTML data enabling the partner communication device PC 30 receiving this HTML data to display the data presentation screen (provided with an icon for the previous page movement instruction) as illustrated in FIG. 5.

Then, the data presentation device 10 finishing the process of step S204, after erasing the main sort data on the memory (step S205), terminates the processes (the processes for the received next page movement request) in FIG. 9.

Next, an operation of the data presentation device 10 with respect to the previous page movement instructing icon will be explained.

Figure 10:
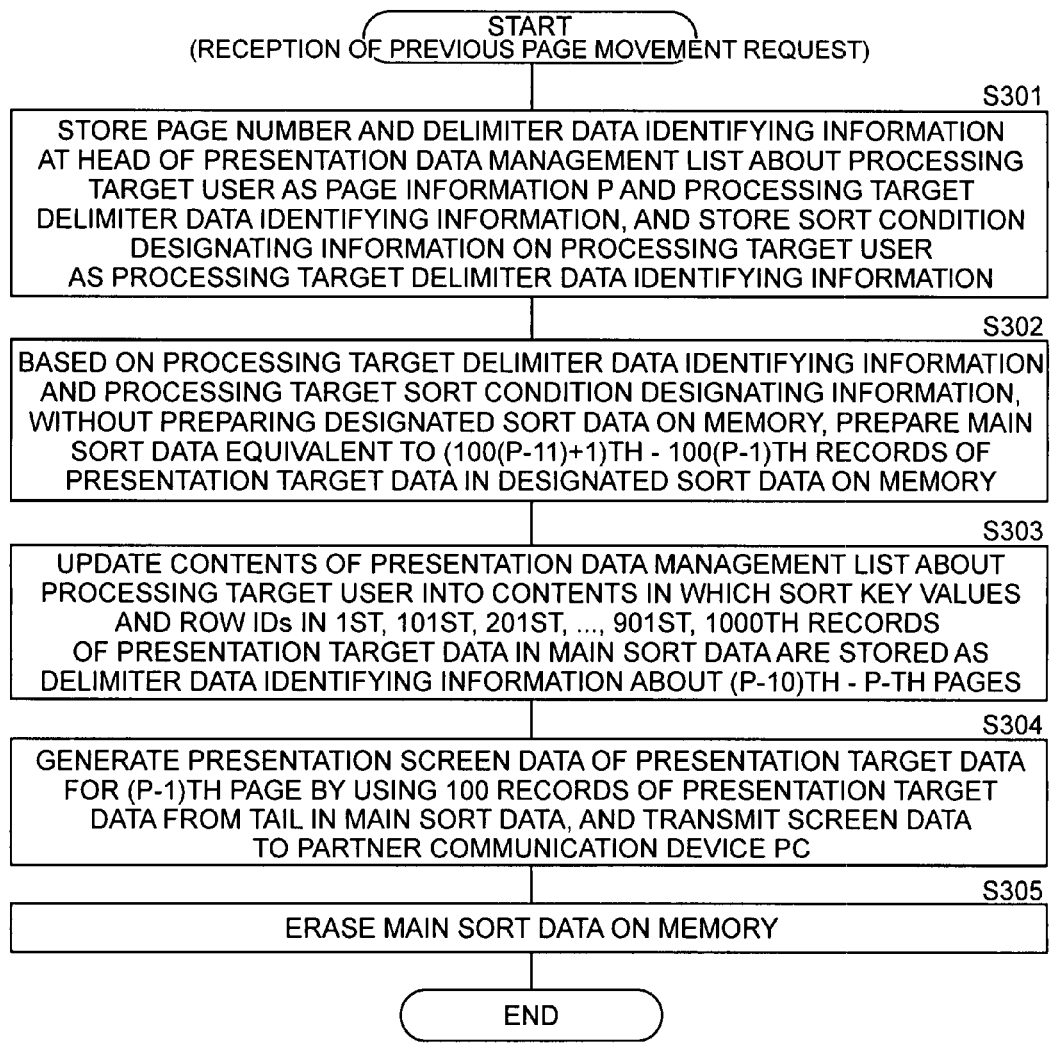
[FIG. 10] A flowchart of processes executed by the data presentation device when receiving a previous page movement request.

The data presentation device 10 receiving the previous page movement request, as shown in FIG. 10, at first, executes a process (step S301) of storing a page number and delimiter data identifying information that are stored at the head of the presentation data management list related to the processing target user (an operator of the previous page movement request) as page information P and processing target delimiter data identifying information, and storing the sort condition designating information about the processing target user as processing target sort condition designating information.

Subsequently, the data presentation device 10 executes a process (step S302) of preparing, based on the processing target delimiter data identifying information and the processing target sort condition designating information, without preparing the designated sort data on the memory, the main sort data equivalent to (100·(P−11)+1)th through (100·(P−1))th records of presentation target data in the designated sort data on the memory.

The process executed by the data presentation device 10 in step S302 is basically the process having the same content as that of the process executed by the data presentation device 10 in step S202 (or step S102 in FIG. 7). The process executed by the data presentation device 10 in step S302 is, however, a process conducted in a way that targets at only the presentation target data of which the first sort key value, stored in the presentation target data DB 12, is equal to or smaller than the processing target first sort key value if the processing target sorting direction designated value is a value representing the ascending sequence. Further, the process executed by the data presentation device 10 in step S302 is a process in which the presentation target data of which the sort key value and the ROW ID are coincident with the sort key value and the ROW ID in the processing target delimiter data identifying information, is treated as the (100·(P−1)+1)th record of presentation target data.

The data presentation device 10 finishing the process of step S302 executes a process (step S303) of updating the contents of the presentation data management list about the processing target user into the contents in which the respective sort key values and ROW IDs in the 1st, 101st, 201st, . . . , 901st and 1000th records of presentation target data (the presentation target data equivalent to the (100·(P−11)+1)th, (100·(P−10)+1)th, (100·(P−9)+1)th, . . . , (100·(P−2)+1)th and (100·(P−1)th records of data) in the main sort data on the memory, are stored as the delimiter data identifying information related to the (P−10)th through P-th pages.

Figure 6:
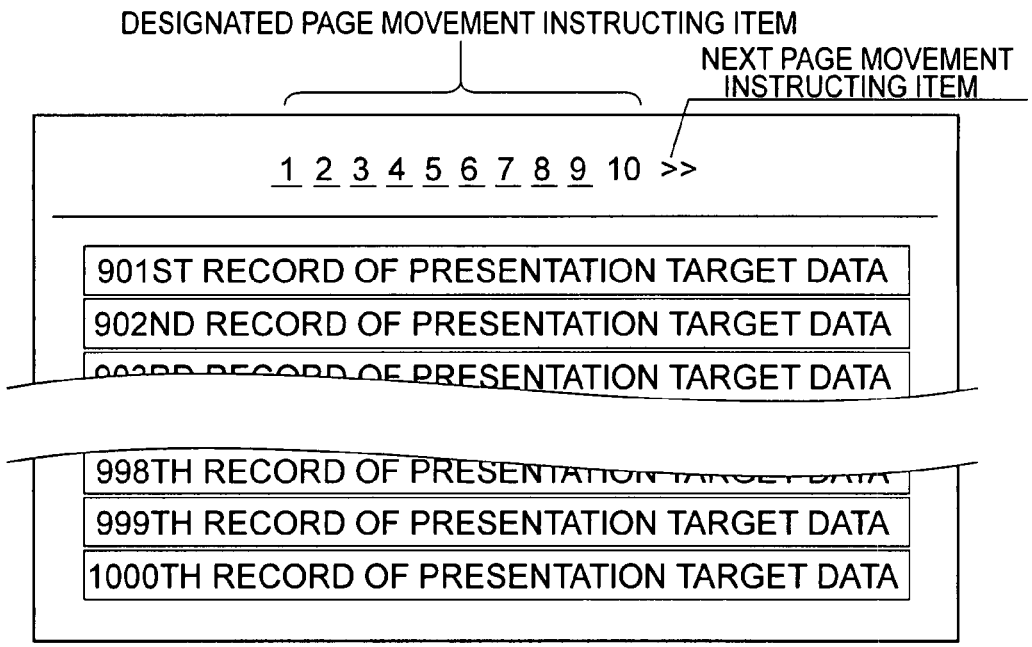
[FIG. 6] An explanatory diagram of the data presentation screen provided to the user by the data presentation device.
Figure 11:
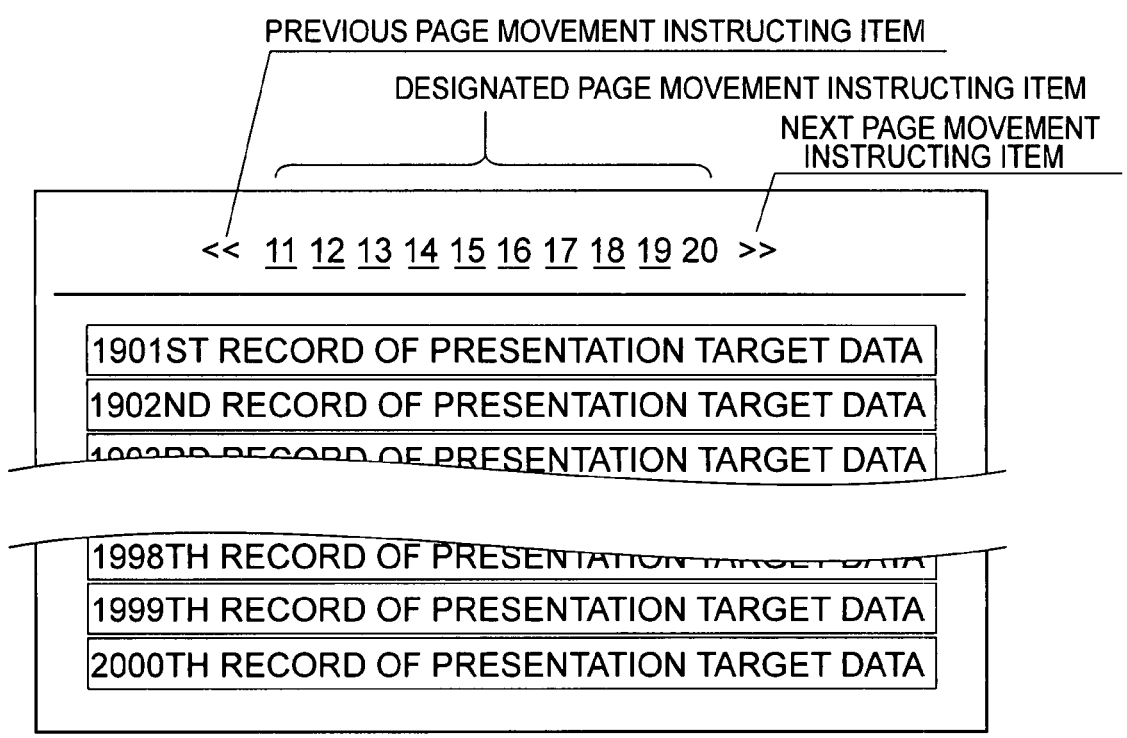
[FIG. 11] A diagram showing one example of a data presentation screen displayed on a display of a PC through the processes in FIG. 10.

Thereafter, the data presentation device 10 executes a process (step S304) of generating the data presentation screen data for the (P−1)th page by employing 100 records of presentation target data (the presentation target data group equivalent to the (100·(P−2)+1)th through (100·(P−1))th records of presentation target data in the designated sort data) on the tail side in the main sort data on the memory, and transmitting the generated screen data to the partner communication device PC 30. Note that the data presentation screen data for the (P−1)th page, which is generated and transmitted by the data presentation device 10 in the process of step S304, is the HTML data enabling the partner communication device PC 30 receiving this HTML data to display the data presentation screen as illustrated in FIG. 6 and the data presentation screen as illustrated in FIG. 11.

Then, the data presentation device 10 finishing the process of step S304, after erasing the main sort data on the memory (step S305), terminates the processes (the processes for the received previous page movement request) in FIG. 10.

Next, an operation of the data presentation device 10 with respect to a designated page movement request will be explained.

Figure 12:
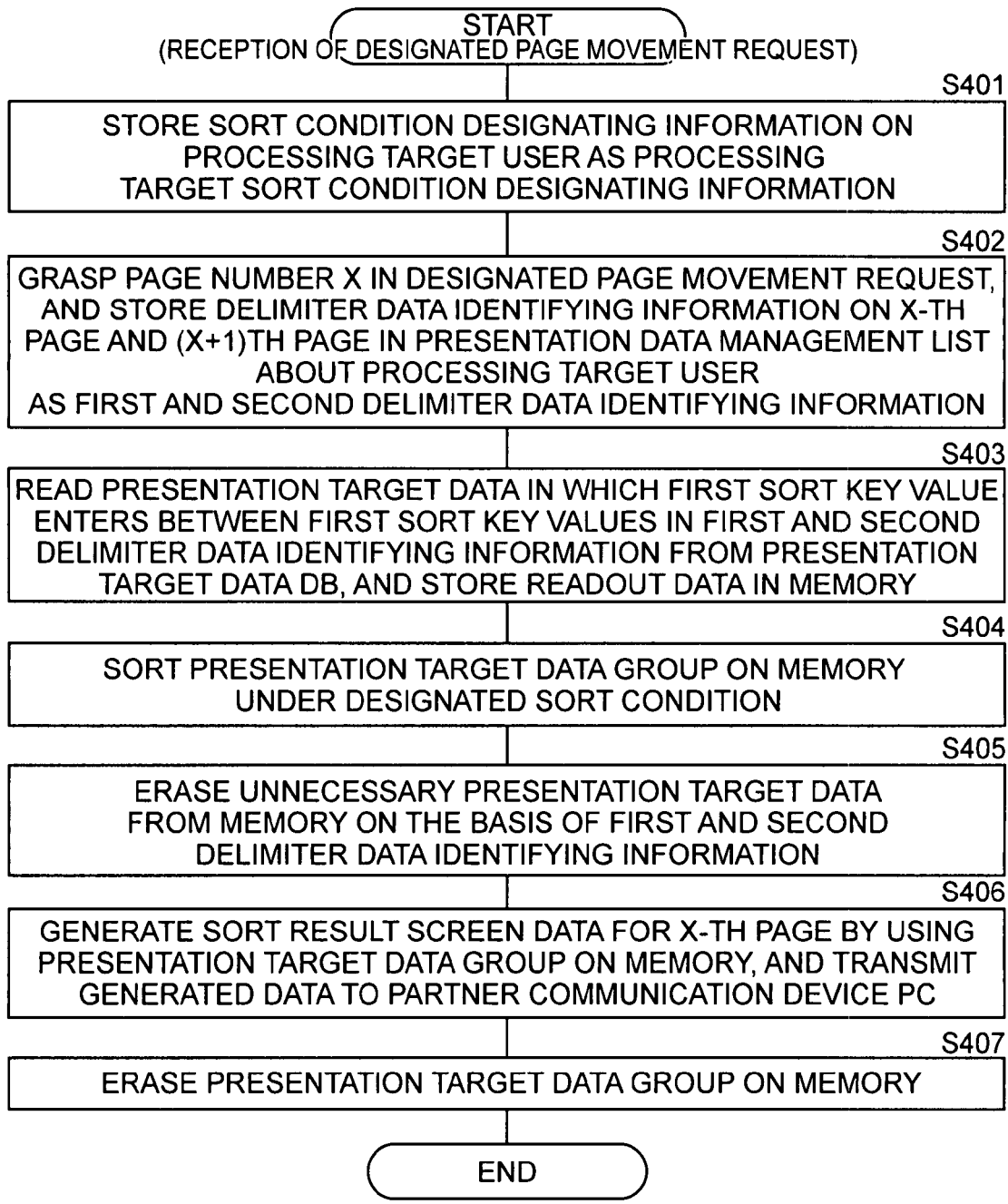
[FIG. 12] A flowchart of processes executed by the data presentation device when receiving a designated page movement request.

When the designated page movement request is transmitted, the data presentation device 10 executes processes in procedures shown in FIG. 12.

Namely, the data presentation device 10 receiving the designated page movement request, to start with, stores the sort condition designating information about the processing target user (the operator of the designated page movement request) as the processing target sort condition designating information (step S401). Subsequently, the data presentation device 10 grasps a page number X contained in the designated page movement request, and stores delimiter data identifying information about the X-th page, the (X+1)th page in the presentation data management list related to the processing target user as first delimiter data identifying information and second delimiter data identifying information, respectively (step S402).

Thereafter, the data presentation device 10 executes a process (step s403) of reading from the presentation target data DB 12 the presentation target data containing the first sort key value between the first sort key value in the first delimiter data identifying information and the first sort key value in the second delimiter data identifying information, and stores the thus-read presentation target data in the memory. More specifically, in step S403, the data presentation device 10, if "the first sort key value in the first delimiter data identifying information≦"the first sort key value in the second delimiter data identifying information", executes a process of reading, from the presentation target data DB 12, the presentation target data in which the first sort key value is equal to or larger than "the sort key value in the first delimiter data identifying information" but equal to or less than "the sort key value in the second delimiter data identifying information", and storing the thus-read presentation target data in the memory. Moreover, the data presentation device 10, if "the first sort key value in the first delimiter data identifying information>"the first sort key value in the second delimiter data identifying information", executes the process of reading, from the presentation target data DB 12, the presentation target data in which the first sort key value is equal to or smaller than "the sort key value in the first delimiter data identifying information" but equal to or larger than "the sort key value in the second delimiter data identifying information", and storing the thus-read presentation target data in the memory.

Thereafter, the data presentation device 10 executes a process (step S404) of sorting the presentation target data group read onto the memory under the designated sort conditions (the sort condition designated by the processing target sort condition designating information).

Then, the presentation target data group read onto the memory at this point of time contains the presentation target data unrequired for generating sort result image data for the X-th page, and hence the data presentation device 10 executes, based on the first delimiter data identifying information and the second delimiter data identifying information, a process (step S405) of erasing the first through anterior to the (100·(X−1))th records of presentation target data in the designated sort data and the (100·X+1))th through the last records of presentation target data in the sequence in the designated sort data. More specifically, the data presentation device 10, in step S405, executes the process of erasing some records (including a case of being "0") of presentation target data up to the presentation target data one before the presentation target data in which the sort key value and the ROW ID are coincident with the sort key value and ROW ID in the first delimiter data identifying information from the head presentation target data in the sorted result, and all records of presentation target data (at least one record of presentation target data in this category exists) after the presentation target data in which the sort key value and the ROW ID are coincident with the sort key value and the ROW ID in the second delimiter data identifying information in the sorted result.

Then, the data presentation device 10 executes a process (step S405) of generating the data presentation screen data (see FIG. 4) for the X-th page by employing the 100 records of presentation target data ((100·(X−1)+1)th through (100·X) th records of presentation target data in the sequence in the designated sort data) on the memory and transmitting the generated screen data to the partner communication device PC 30, and a process (step S406) of erasing the presentation target data group on the memory, and thereafter terminates the processes (the processes for the received designated page movement request) in FIG. 12.

Finally, an operation of the data presentation device 10 when displaying the presentation target data on the tail side in the designated sort data will be briefly explained.

Figures 13, 14:
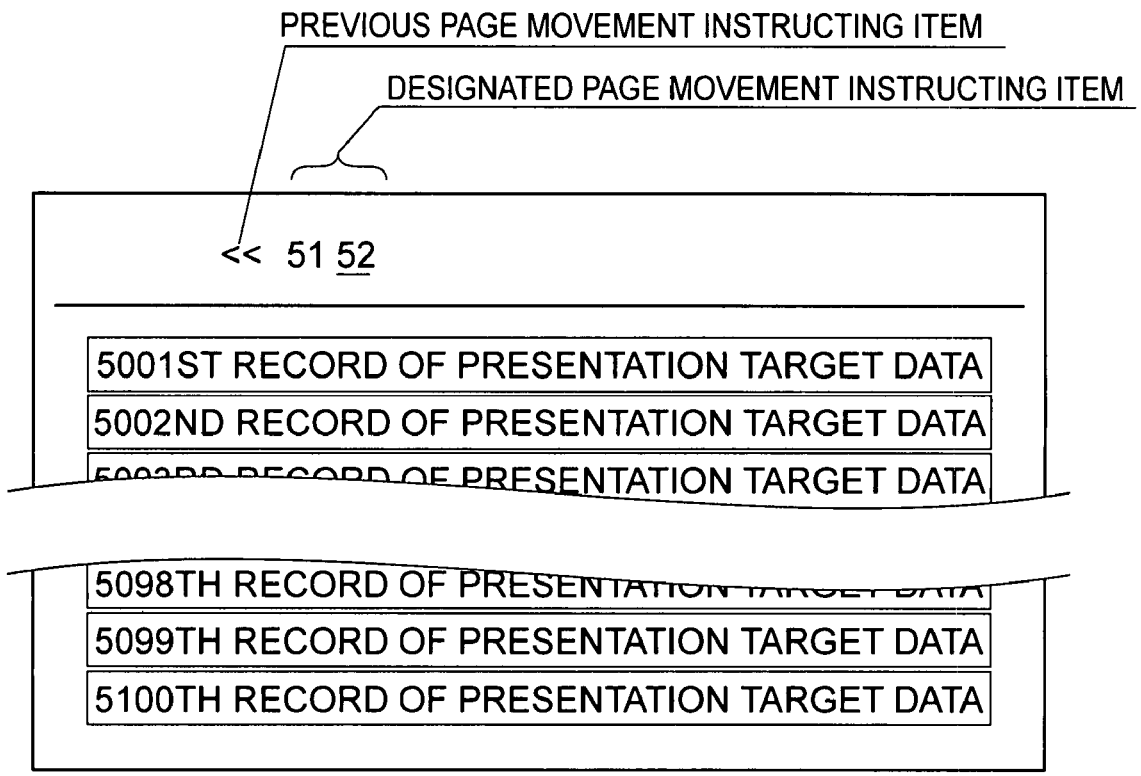
[FIG. 13] An explanatory diagram of statuses that can be taken by a presentation data management list after a process of step S203 in FIG. 9.
[FIG. 14] An explanatory diagram of the data presentation screen provided to the user by the data presentation device.

The process of step S203 (FIG. 9) is a process of changing, if disabled to prepare the 100 records of main sort data on the memory in the process of step S202, the presentation data management list related to the processing target user into the list having the contents shown in FIG. 13, i.e., the contents in which the delimiter data identifying information consisting of the sort key value and the ROW ID in the presentation target data at the tail of the prepared main sort data is stored in the way of being associated with the page number "0". Moreover, the process of step S204 is a process of making, if disabled to prepare the 100 records of main sort data on the memory in the process of step S202, the partner communication device PC 30 display the data presentation screen (having a structure corresponding to the contents of the presentation data management list) as illustrated in FIG. 14.

Further, the process of step S402 (FIG. 12) is a process of storing, if the delimiter data identifying information about the (X+1)th page is not stored in the presentation data management list, the delimiter data identifying information about the 0th page as the second delimiter data identifying information.

Figure 15:
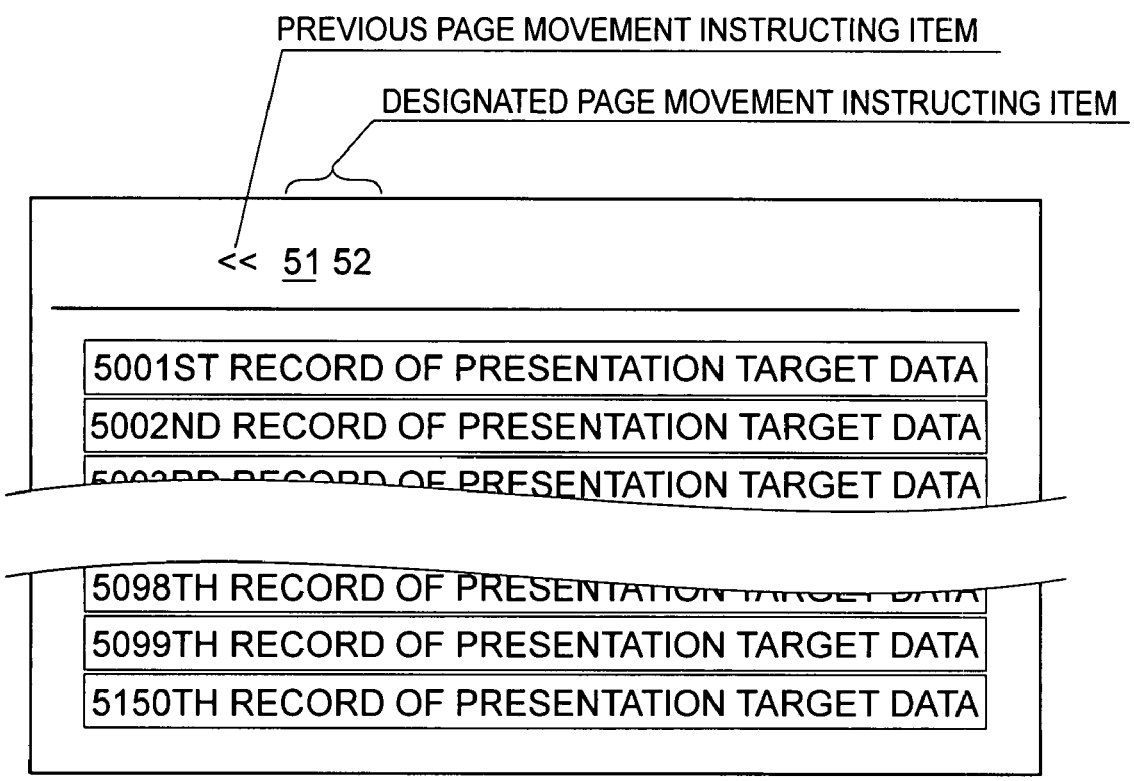
[FIG. 15] An explanatory diagram of the data presentation screen provided to the user by the data presentation device.

Furthermore, if the delimiter data identifying information about the (X+1)th page is not stored in the presentation data management list, in step S405, the data presentation device 10 executes a process of erasing only some records (including a case of being "0") of presentation target data up to the presentation target data one before the presentation target data in which the sort key value and the ROW ID are coincident with the sort key value and ROW ID in the first delimiter data identifying information from the head presentation target data in the sorted result and, in step S406, executes a process of making the partner communication device PC 30 display the data presentation screen (the data presentation screen on which to display the presentation target data of which a data count is less than "100" and of which a structure corresponds to the contents of the presentation data management list) as illustrated in FIG. 15 by employing some records of presentation target data on the memory at that point of time.

As discussed in detail so far, the data presentation device 10 according to the present embodiment, without performing the process of preparing on the memory the data into which all the presentation target data within the presentation target data DB 12 is sorted, takes the scheme of providing the user with each data presentation screen on which 100 records of presentation target data are displayed. Accordingly, it can be said that the data presentation device 10 is the device capable of presenting the sorted result of the data to the user in such a form as not to use the storage area of the memory with futility. Moreover, the data presentation device 10 is, it can be also said, configured to enable the device, presenting the sorted result of the data to the user, to be manufactured with the less storage capacity of the must-be-mounted memory than the should-be-processed data size.

<<Modified Mode>>

The data presentation device 10 described above can be modified in a variety of forms. For example, the data presentation device 10 can be modified, wherein the data presentation screen is structured as a screen including none of the designated page movement instructing item, and, when performing the processes in FIGS. 9 and 10, such a process is executed that 100 records of presentation target data are prepared on the memory and the data presentation screen on which to display these records of data is displayed on the display of the PC 30. Still further, on the occasion of manufacturing the data presentation device 10 that sets as the sorting target the presentation target data group with none of the data item values being coincident, the structure related to the ROW ID can be removed from the data presentation device 10 described above.

Yet further, as a matter of course, a search function can be added to the data presentation device 10, and the number of the records of the presentation target data displayed on one screen may not be set to "100".

The invention claimed is:

1. A data presentation device comprising:
   a sort target database stored with plural records of presentation target data;
   input accepting means accepting an input of sort condition designating information for designating which data item partially structuring the presentation target data is set as a sort key;
   main sort data first display means preparing, on a display, main sort data corresponding to first through Nth records of presentation target data group in designated sort data defined as data obtained by sorting all the presentation target data stored in said sort target database when said input accepting means accepts the input of the sort condition designating information under conditions designated by the sort condition designating information in a form that does not store in said memory the presentation target data assured of being the (N+1)th through last records of data, and displaying the thus-prepared main sort data on a display;
   display instruction accepting means accepting a next main sort data display instruction that instructs said display to display the main sort data corresponding to the ((K+1)·N+1)th through the ((K+2)·N)th records of presentation target data when the main sort data corresponding to the (K·N+1)th through the ((K+1)·N)th records of presentation target data (where K is a natural number) in the designated sort data is displayed on said display; and
   main sort data second display means limiting processing target presentation target data within said sort target database by use of a value of the sort key in the ((K+1)·N)th record of presentation target data that is, when said display instruction accepting means accepts the next main sort data display instruction, displayed at this point of time on said display, preparing on said memory the main sort data corresponding to the ((K+1)·N+1)th through the ((K+2)·N)th records of presentation target data in the designated sort data in a form that does not store in said memory the presentation target data assured of being the ((K+2)·(N+1))th through last records of data, and displaying the thus-prepared main sort data on said display.

2. A data presentation device according to claim 1, wherein said display instruction accepting means, when the main sort data corresponding to the (K·N+1)th through ((K+1)·N)th records of presentation target data group in the designated sort data is displayed on said display, accepts the next main sort data display instruction and a previous main sort data display instruction that instructs said display to display the main sort data corresponding to the ((K−1)·(N+1))th through the (K·N)th records of presentation target data, and said main sort data second display means limits the processing target presentation target data within said sort target database by use of a value of the sort key in the (K·(N+1))th record of presentation target data that is, when said display instruction accepting means accepts the previous main sort data display instruction, displayed at this point of time on said display, prepares on said memory the main sort data corresponding to the ((K−1)·(N+1))th through the (K·N)th records of presentation target data in the designated sort data in a form that does not store in said memory the presentation target data assured of being the first through the ((K−1)·N)th records of data, and displays the thus-prepared main sort data on said display.

3. A data presentation device according to claim 2, wherein said sort target database is a database stored with the presentation target data in a form that associates the presentation target data with a unique piece of data identifying information, said main sort data second display means limits the processing target presentation target data within said sort target database by use of a value of the sort key in the (K·N+1)th record of presentation target data that is, when said display instruction accepting means accepts the previous main sort data display instruction, displayed at this point of time on said display and by use of the data identifying information about the presentation target data, and limits the processing target presentation target data within said sort target database by use of a value of the sort key in the ((K+1)·N)th record of presentation target data that is, when said display instruction accepting means accepts the next main sort data display instruction, displayed at this point of time on said display and by use of the data identifying information about the presentation target data.

4. A computer readable media storing a data presentation program, the data presentation program making a computer including a sort target database stored with plural records of presentation target data, function as a device comprising:
   input accepting means accepting an input of sort condition designating information for designating which data item partially structuring the presentation target data is set as a sort key;
   main sort data first display means preparing, on a display, main sort data corresponding to first through Nth records of presentation target data group in designated sort data defined as data obtained by sorting all the presentation target data stored in said sort target database when said input accepting means accepts the input of the sort condition designating information under conditions designated by the sort condition designating information in a form that does not store in said memory the presentation target data assured of being the (N+1)th through last records of data, and displaying the thus-prepared main sort data on a display;
   display instruction accepting means accepting a next main sort data display instruction that instructs said display to display the main sort data corresponding to the ((K+1)·N+1)th through the ((K+2)·N))th records of presentation target data when the main sort data corresponding to the (K·N+1)th through the ((K+1)·N)th records of presentation target data (where K is a natural number) in the designated sort data is displayed on said display; and
   main sort data second display means limiting processing target presentation target data within said sort target database by use of a value of the sort key in the ((K+1)·N)th record of presentation target data that is, when said display instruction accepting means accepts the next main sort data display instruction, displayed at this point of time on said display, preparing on said memory the main sort data corresponding to the ((K+1)·N+1)th through the ((K+2)·N)th records of presentation target data in the designated sort data in a form that does not store in said memory the presentation target data assured of being the ((K+2)·N+1)th through last records of data, and displaying the thus-prepared main sort data on said display.

5. A computer readable medium according to claim 4, wherein said display instruction accepting means, when the main sort data corresponding to the (K·N+1)th through ((K+1)·N)th records of presentation target data group in the designated sort data is displayed on said display, accepts the next main sort data display instruction and a previous main sort data display instruction that instructs said display to display the main sort data corresponding to the ((K−1)·N+1)th through the (K·N)th records of presentation target data, and said main sort data second display means limits the processing target presentation target data within said sort target database by use of a value of the sort key in the (K·N+1)th record of presentation target data that is, when said display instruction accepting means accepts the previous main sort data display instruction, displayed at this point of time on said display, prepares on said memory the main sort data corresponding to the ((K−1)·N+1)th through the (K·N)th records of presentation target data in the designated sort data in a form that does not store in said memory the presentation target data assured of being the first through the ((K−1)·N)th records of data, and displays the thus-prepared main sort data on said display.

6. A computer readable medium according to claim 5, wherein said sort target database is a database stored with the presentation target data in a form that associates the presentation target data with a unique piece of data identifying information, said main sort data second display means limits the processing target presentation target data within said sort target database by use of a value of the sort key in the (K·N+1)th record of presentation target data that is, when said display instruction accepting means accepts the previous main sort data display instruction, displayed at this point of time on said display and by use of the data identifying information about the presentation target data, and limits the processing target presentation target data within said sort target database by use of a value of the sort key in the ((K+1)·N)th record of presentation target data that is, when said display instruction accepting means accepts the next main sort data display instruction, displayed at this point of time on said display and by use of the data identifying information about the presentation target data.

7. A computer readable medium storing a data presentation program, the data presentation program making a computer including a sort target database stored with plural records of presentation target data, function as a device comprising:

input accepting means accepting an input of sort condition designating information for designating which data item partially structuring the presentation target data is set as a sort key;

presentation target data first display means preparing on a memory main sort data corresponding to the first through the (N·M)th records of presentation target data group in designated sort data obtained by sorting all the presentation target data stored in said sort target database under conditions designated by the sort condition designating information when said input accepting means accepts the input of the sort condition designating information in a form that does not store in said memory the presentation target data assured of being the (N·M+1)th through the last records, displaying N-records of presentation target data group from the head in the prepared main sort data on said display, storing a value of a sort key in the (1+J·N)th record of presentation target data with respect to each of integer values J of 0 to M−1 as information on the (J+1)th page, and generating on said memory a presentation data management list in which the value of the sort key in the (N·M)th record of presentation target data is stored as the information on the (M+1)th page;

display instruction accepting means accepting, when N-records of presentation target data group in the (K·N·M+1)th through the ((K+1)·N·M)th records of presentation target data in the designated sort data (where K is a natural number) are displayed on said display, a page designation data display instruction that instructs said display to display each of the (K·M+1)th through the (K·M+M)th pages, and a next page data display instruction that instructs said display to display the (K·M+M+1)th page;

presentation target data second display means preparing on said memory, when said display instruction accepting means accepts the next page data display instruction, without preparing the designated sort data on said memory, the main sort data corresponding to ((K·M+M)·N+1)th through ((K·M+2M)·N)th records of presentation target data in a way that limits the processing target presentation target data within said sort target database by use of a value of a sort key that is stored in the tail of the presentation data management list, displaying on said display the N-records of presentation target data from the head in the prepared main sort data, and changing the presentation data management list into a list in which a value of a sort key in the (1+J·N)th record of presentation target data with respect to each of integer values J of K·M+M+1 through K·M+2·M is stored as information on the (J+1)th page, and a value of a sort key in the ((K·M+2M)·N)th record of presentation target data is stored as information on the (K·M+2M+1)th page; and presentation target data third display means preparing on said memory, when said display instruction accepting means accepts a page designated data display instruction that instructs said display to display the (K·M+X)th (X=1 to M), without preparing the designated sort data on said memory, the ((K·M+X−1)·N+1))th through the ((K·M+X)·N)th records of presentation target data group in a way that limits the processing target presentation target data within said sort target database by use of values of two sort keys that are stored in the presentation data management list with respect to the Xth page and the (X+1)th page, and displaying the prepared presentation target data group on said display.

8. A data presentation method making a computer execute:

an input accepting step of accepting an input of sort condition designating information for designating which data item partially structuring the presentation target data is set as a sort key;

a main sort data first display step of preparing, on a display, main sort data corresponding to first through Nth records of presentation target data group in designated sort data defined as data obtained by sorting all the presentation target data stored in said sort target database when the input of the sort condition designating information is accepted in said input accepting step under conditions designated by the sort condition designating information in a form that does not store in said memory the presentation target data assured of being the (N+1)th through last records of data, and displaying the thus-prepared main sort data on a display;

a display instruction accepting step of accepting a next main sort data display instruction that instructs said display to display the main sort data corresponding to the $((K+1)\cdot N+1)$th through the $((K+2)\cdot N)$th records of presentation target data when the main sort data corresponding to the $(K\cdot N+1)$th through the $((K+1)\cdot N)$th records of presentation target data (where K is a natural number) in the designated sort data is displayed on said display; and a main sort data second display step of limiting processing target presentation target data within said sort target database by use of a value of the sort key in the $((K+1)\cdot N)$th record of presentation target data that is, when the next main sort data display instruction is accepted in said display instruction accepting step, displayed at this point of time on said display, preparing on said memory the main sort data corresponding to the $((K+1)\cdot N+1)$th through the $((K+2)\cdot N)$th records of presentation target data in the designated sort data in a form that does not store in said memory the presentation target data assured of being the $((K+2)\cdot N+1)$th through last records of data, and displaying the thus-prepared main sort data on said display.

9. A data presentation method according to claim 8, wherein said display instruction accepting step is a step of, when the main sort data corresponding to the $(K\cdot N+1)$th through $((K+1)\cdot N)$th records of presentation target data group in the designated sort data is displayed on said display, accepting the next main sort data display instruction and a previous main sort data display instruction that instructs said display to display the main sort data corresponding to the $((K-1)\cdot N+1)$th through the $(K\cdot N)$th records of presentation target data, and said main sort data second display step is a step of limiting the processing target presentation target data within said sort target database by use of a value of the sort key in the $(K\cdot N+1)$th record of presentation target data that is, when the previous main sort data display instruction is accepted in said display instruction accepting step, displayed at this point of time on said display, preparing on said memory the main sort data corresponding to the $((K-1)\cdot N+1)$th through the $(K\cdot N)$th records of presentation target data in the designated sort data in a form that does not store in said memory the presentation target data assured of being the first through the $((K-1)\cdot N)$th records of data, and displaying the thus-prepared main sort data on said display.

10. A data presentation method according to claim 9, wherein said sort target database is a database stored with the presentation target data in a form that associates the presentation target data with a unique piece of data identifying information, said main sort data second display step is a step of limiting the processing target presentation target data within said sort target database by use of a value of the sort key in the $(K\cdot N+1)$th record of presentation target data that is, when the previous main sort data display instruction is accepted in said display instruction accepting step, displayed at this point of time on said display and by use of the data identifying information about the presentation target data, and limiting the processing target presentation target data within said sort target database by use of a value of the sort key in the $((K+1)\cdot N)$th record of presentation target data that is, when the next main sort data display instruction is accepted in said display instruction accepting step, displayed at this point of time on said display and by use of the data identifying information about the presentation target data.

* * * * *

UNITED STATES PATENT AND TRADEMARK OFFICE
CERTIFICATE OF CORRECTION

PATENT NO. : 7,778,990 B2
APPLICATION NO. : 11/901469
DATED : August 17, 2010
INVENTOR(S) : Ito et al.

Page 1 of 1

It is certified that error appears in the above-identified patent and that said Letters Patent is hereby corrected as shown below:

In the Claims:

Claim 1, Col. 11, line 48    Delete "$((K+2) \cdot (N+1)th$" and replace it with --$((K+2) \cdot N+1)th$--

Claim 2, Col. 11, line 58    Delete "$((K-1) \cdot (N+1)th$" and replace it with --$((K-1) \cdot N+1)th$--

Claim 2, Col. 12, line 1     Delete "$((K-1) \cdot (N+1)th$" and replace it with --$((K-1) \cdot N+1)th$--

Signed and Sealed this
Eighth Day of February, 2011

David J. Kappos
*Director of the United States Patent and Trademark Office*